: US008167133B2

United States Patent
Nieminen et al.

(10) Patent No.: US 8,167,133 B2
(45) Date of Patent: May 1, 2012

(54) FLOTATION CELL

(75) Inventors: Erkka Nieminen, Tampere (FI); Veikko Kankaanpää, Valkeakoski (FI); Vesa Harju, Tampere (FI)

(73) Assignee: Metso Paper, Inc. (FI)

( * ) Notice: Subject to any disclaimer, the term of this patent is extended or adjusted under 35 U.S.C. 154(b) by 1106 days.

(21) Appl. No.: 11/917,887

(22) PCT Filed: Jun. 15, 2006

(86) PCT No.: PCT/FI2006/050261
§ 371 (c)(1),
(2), (4) Date: Dec. 17, 2007

(87) PCT Pub. No.: WO2006/134235
PCT Pub. Date: Dec. 21, 2006

(65) Prior Publication Data
US 2008/0211119 A1 Sep. 4, 2008

(30) Foreign Application Priority Data
Jun. 17, 2005 (FI) .................................... 20055328

(51) Int. Cl.
*B03D 1/24* (2006.01)
*B01F 3/04* (2006.01)
*D21C 5/02* (2006.01)
(52) U.S. Cl. .......... 209/170; 209/164; 261/76; 261/123; 261/DIG. 75; 162/4
(58) Field of Classification Search .................. 209/164, 209/170; 261/76, 123, DIG. 75; 162/4
See application file for complete search history.

(56) References Cited

U.S. PATENT DOCUMENTS

| 4,464,309 A | | 8/1984 | Linhardt | |
|---|---|---|---|---|
| 4,477,341 A | * | 10/1984 | Schweiss et al. | 209/170 |
| 5,332,100 A | * | 7/1994 | Jameson | 209/164 |
| 5,465,848 A | | 11/1995 | Veh et al. | |
| 6,220,578 B1 | | 4/2001 | Popov | |
| 6,920,983 B2 | * | 7/2005 | Gabl | 209/170 |

FOREIGN PATENT DOCUMENTS

| EP | 0 196 120 | | 10/1986 |
|---|---|---|---|
| JP | 61-54248 A | | 3/1986 |
| WO | WO 92/03220 A1 | * | 8/1991 |
| WO | WO 2005/044434 A1 | | 5/2005 |

OTHER PUBLICATIONS

Extended European Search Report dated Feb. 15, 2012 for Application No. EP 06764500.2.

* cited by examiner

Primary Examiner — Thomas M Lithgow
(74) Attorney, Agent, or Firm — Alston & Bird LLP

(57) ABSTRACT

An injector of a flotation cell, the injector comprising a feed pipe for feeding a fiber suspension flow into the flotation cell, a mixing apparatus for mixing air into the fiber suspension flow and at least one air feed connection arranged before the mixing apparatus for feeding air into the injector. The injector further comprises a nozzle section which is arranged before the mixing apparatus and comprises an aperture plate provided with apertures and nozzles fixed to the aperture plate substantially at the apertures after the aperture plate, there being open spaces between the nozzles. The air to be fed from the air feed connection is arranged to flow into the spaces between the nozzles and further into the mixing apparatus with the partial flows of the fiber suspension flow entering from the nozzles.

13 Claims, 6 Drawing Sheets

FLOTATION CELL

CROSS REFERENCE TO RELATED APPLICATIONS

This application is a 35 U.S.C. 371 national phase application of International Application No. PCT/FI2006/050261, filed Jun. 15, 2006, which International Application was published by the International Bureau in English on Dec. 21, 2006, and claims priority to Finnish Application No. 20055328, filed Jun. 17, 2005, both of which are incorporated herein by reference in their entirety.

BACKGROUND OF THE INVENTION

The invention relates to an injector of a flotation cell, the injector comprising a feed pipe for feeding a fibre suspension flow into the flotation cell, a mixing apparatus for mixing air into the fibre suspension flow and at least one air feed connection arranged before the mixing apparatus for feeding air into the injector.

The invention also relates to a nozzle section of a flotation cell injector.

The invention further relates to a flotation cell for removing ink or impurities from a fibre suspension.

The invention further relates to a method of mixing a fibre suspension flow and air into each other in a flotation cell injector, the injector comprising a feed pipe for feeding a fibre suspension flow into the flotation cell, a mixing apparatus for mixing air into the fibre suspension flow and at least one air feed connection arranged before the mixing apparatus for feeding air into the injector, the method comprising feeding the fibre suspension flow into the injector, dividing the fed fibre suspension flow into partial flows, feeding air to be mixed into the fibre suspension flow into the injector, feeding the partial flows of the fibre suspension flow into the mixing apparatus forming a pre-mixing phase of the injector, whereby air fed into the injector is carried into the pre-mixing phase by the partial flows, and mixing air carried into the pre-mixing phase by the partial flows into these partial flows.

Flotation cells, i.e. flotation containers, are used to remove ink and any impurities from a fibre suspension produced from disintegrated and sorted recycled paper. This process is also called deinking. The purpose of deinking is to obtain as white and clean recycled fibre pulp as possible. Flotation cells are used in flotation deinking, where flotation is performed in cells by adding soap or another flotation stimulating and surface tension preventing chemical as a flotation chemical into a diluted, approximately 1-% fibre suspension. In addition, air is mixed into the fibre suspension. Ink and impurities stick to air bubbles that rise to the surface of the fibre suspension, and thus ink and impurities can be removed by means of overflow or by scraping.

U.S. Pat. No. 5,465,848 discloses a flotation container. The flotation container includes an injector provided with a feed pipe for introducing a fibre suspension flow into the flotation container and for mixing air into the fibre suspension flow. In addition to the feed pipe, the injector comprises an aperture plate for dividing the fibre suspension flow to be fed into the flotation container into smaller partial flows. Downstream of the aperture plate and at a distance from it, there are pipe sections which form a mixing apparatus and where the partial flows of the fibre suspension flow entering through the apertures of the aperture plate and air are pre-mixed into each other. An air fitting is arranged between the aperture plate and the pipe sections on the side of the injector. The air fitting is used to introduce air to be mixed with the fibre suspension flow into the injector, whereby the air to be introduced into the injector is carried by the partial flows into the mixing devices forming a pre-mixing phase.

A problem associated with the injector described in U.S. Pat. No. 5,465,848 is the difficulty of feeding a sufficient amount of air into the injector in particular for the partial flows of the fibre suspension flow that are formed in the middle section of the aperture plate. It is difficult for the air to be fed through the air fitting on the side of the injector to reach the partial flows of the fibre suspension flows that are formed in the middle section of the aperture plate. In the course of time, this problem will be emphasized as pulp splashes block the space where air is fed between the aperture plate and the pipe sections.

BRIEF DESCRIPTION OF THE INVENTION

The object of the present invention is to provide a new and improved solution for mixing air into a fibre suspension flow.

The flotation cell injector according to the invention is characterized in that the injector further comprises a nozzle section which is arranged before the mixing apparatus and comprises an aperture plate provided with apertures and nozzles fixed to the aperture plate substantially at the apertures after the aperture plate, there being open spaces between the nozzles and the apertures in the aperture plate of the nozzle section being arranged to divide the fibre suspension flow to be fed into the feed pipe into partial flows, and the nozzles of the nozzle section being arranged to guide the partial flows into the mixing apparatus, and the aperture plate of the nozzle section being arranged before the air feed connection so that the air to be fed from the air feed connection is arranged to flow into the spaces between the nozzles and further into the mixing apparatus with the partial flows of the fibre suspension flow entering from the nozzles.

The nozzle section according to the invention is characterized in that the nozzle section comprises an aperture plate provided with apertures and nozzles fixed to the aperture plate substantially at the apertures, there being open spaces between the nozzles.

The flotation cell according to the invention is further characterized in that the flotation cell comprises at least one injector according to claim 1.

Furthermore, the method according to the invention is characterized in that the injector further comprises a nozzle section which is arranged before the mixing apparatus and comprises an aperture plate provided with apertures for dividing the fibre pulp flow to be fed into the feed pipe into partial flows and nozzles fixed to the aperture plate substantially at the apertures after the aperture plate to guide the partial flows to the mixing apparatus, there being open spaces between the nozzles, whereby the air is fed into open spaces between the nozzles and the air flows from the spaces with the partial flows of the fibre pulp flow into a pre-mixing phase.

According to the basic idea of the invention, the flotation cell injector includes a feed pipe for feeding a fibre suspension flow into the flotation cell, a mixing apparatus for mixing air into the fibre suspension flow and at least one air feed connection arranged before the mixing apparatus for feeding air into the injector. Further according to the basic idea, the injector includes a nozzle section which is arranged before the mixing apparatus and comprises an aperture plate provided with apertures and nozzles fixed to the aperture plate substantially at the apertures after the aperture plate, there being open spaces between the nozzles. The apertures in the aperture plate of the nozzle section are arranged to divide the fibre suspension flow to be fed into the feed pipe into partial flows, and the nozzles of the nozzle section are arranged to guide the partial flows into the mixing apparatus. Further according to the basic idea, the aperture plate of the nozzle section is arranged before the air feed connection so that the air to be fed from the air feed connection is arranged to flow into the spaces between the nozzles and further into the mixing apparatus with the partial flows of the fibre suspension flow entering from the nozzles.

An advantage of the invention is that the nozzles of the nozzle plate and the open spaces between them allow mixing of the air to be mixed into the fibre suspension more evenly than before as air can also flow to the nozzles in the middle of the nozzle plate or around them, and consequently to the area of the fibre suspension partial flows that are formed in the middle of the aperture plate. Thus the air absorption capacity of the injector will be better than before. As the partial flows of the fibre suspension travel in the nozzles between which air can circulate freely, the fibre suspension cannot cause splashes or otherwise dirty the injector, which would hamper the flow of the air to be mixed into the fibre suspension downstream of the aperture plate.

BRIEF DESCRIPTION OF THE FIGURES

Embodiments of the invention will be described in greater detail in the enclosed drawings, in which FIG. 1 schematically illustrates a partial cross section of a flotation cell, FIG. 2 schematically illustrates a cross section of a nozzle section and a mixing apparatus, FIG. 3 schematically illustrates a cross section of another nozzle section and mixing apparatus, FIG. 4 schematically illustrates an injector where nozzle pipes function as the nozzles of the nozzle section, FIGS. 5 and 6 schematically illustrate feasible cross-sectional shapes and arrangement of the nozzle pipes in the injector according to FIG. 4, FIGS. 7 and 8 schematically illustrate feasible cross-sectional shapes and arrangement of the pipe sections of the mixing apparatus in the injector according to FIG. 4, FIG. 9 schematically illustrates an injector where planar nozzle cups function as the nozzles of the nozzle section, FIGS. 10, 11, 12 and 13 schematically illustrate feasible cross-sectional shapes and arrangement of the nozzle pipes and nozzle openings in the injector according to FIG. 9, FIGS. 14 and 15 schematically illustrate feasible cross-sectional shapes and arrangement of the pipe sections of the mixing apparatus in the injector according to FIG. 9, FIG. 16 schematically illustrates an injector where conical nozzle cups function as the nozzles of the nozzle section, FIG. 17 schematically illustrates a cross section of a nozzle used in the nozzle section, FIG. 18 schematically illustrates the velocity profile of a fibre suspension flow produced by the nozzle according to FIG. 17, FIG. 19 schematically illustrates a cross section of another nozzle used in the nozzle section, FIG. 20 schematically illustrates the velocity profile of a fibre suspension flow produced by the nozzle according to FIG. 19, and FIGS. 21 to 26 schematically illustrate nozzle opening structures of a nozzle with polygonal cross sections.

For the sake of clarity, the figures illustrate the invention in a simplified manner. In the figures, the same reference numbers refer to the same parts.

DETAILED DESCRIPTION OF EMBODIMENTS OF THE INVENTION

Figure 1:
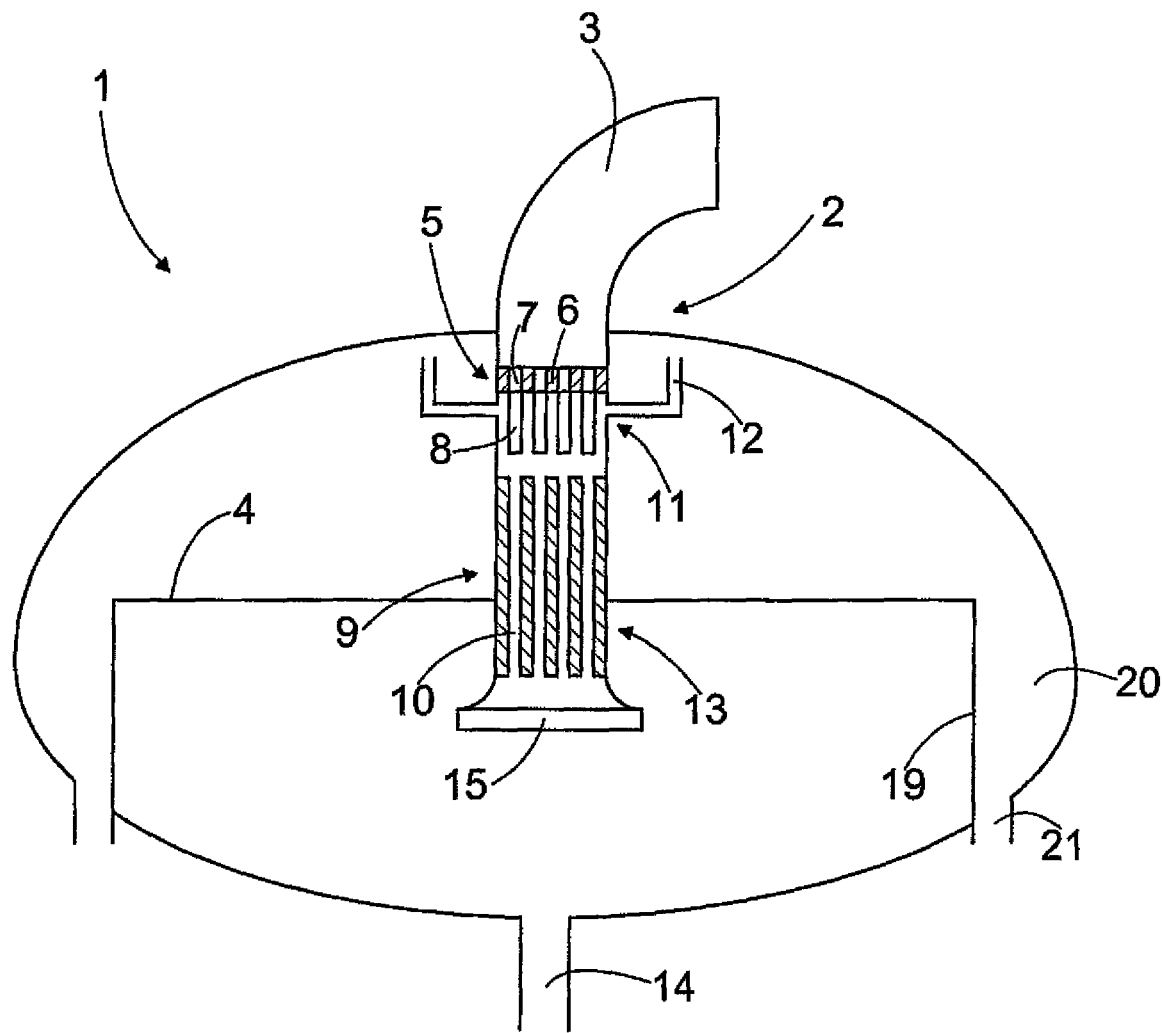

FIG. 1 schematically illustrates a partial cross section of a flotation cell 1 for removing ink and any impurities from a fibre suspension. The flotation cell 1 includes an injector 2, whose feed pipe 3 is used in feeding the fibre suspension and a flotation chemical added thereto, such as soap, into the flotation cell 1. The injector 2 is arranged with respect to the surface 4 of the fibre suspension in the flotation cell 1 so that the lower part of the injector 2 extends slightly below the surface 4 of the fibre suspension. The injector 2 further includes a nozzle section 5 arranged in the extension of the feed pipe 3 or inside the feed pipe, the nozzle section comprising an aperture plate 6 and nozzles 8 fixed to the aperture plate 6, substantially at the apertures 7 of the aperture plate 6 after the aperture plate 6 in the flow direction of the fibre suspension. The feed pipe 3 and the nozzle section 5 thus define a feed space for the injector 2. The cross section of the feed pipe 3 may be circular or elliptical, for instance. It may also have the shape of a square or another equilateral polygon. The nozzle section 5, whose feasible structures will be discussed more closely in connection with FIGS. 2 to 6, includes apertures 7 for dividing the fibre suspension flow entering along the feed pipe 3 into partial flows, which are further fed by the nozzles 8 into a mixing apparatus 9 arranged after the nozzle section 5 in the flow direction of the fibre suspension and inside a mixing pipe 13, for example. The mixing apparatus 9 according to FIG. 1 consists of pipe sections 10, where the nozzles 8 guide the partial flows of the fibre suspension flow entering therefrom. As the partial flows of the fibre suspension flow travel from the nozzles 8 into the mixing apparatus 9, the partial flows absorb air into the mixing apparatus 9 from the space between the aperture plate 6 of the nozzle section 5 and the mixing apparatus 9. The air is fed into this space through air feed connections 11 and air feed channels 12. At least one air feed connection 11 and one air feed channel 12, but preferably more than one, are arranged in an injector 2 casing surrounding the nozzle section 5. This injector 2 casing surrounding the nozzle section may be formed of the feed pipe 3, mixing pipe 13 or of a pipe section separate from these. The purpose of the mixing apparatus 9 is to intensify mixing of air into a fibre suspension by premixing air into the partial flows of the fibre suspension flow. The mixing apparatus 9, where the inner spaces of its pipe sections 10 form the mixing space, forms a kind of pre-mixing phase for mixing the fibre suspension and air into each other. Naturally, the fibre suspension and air may also continue to mix into each other in the flotation cell 1. In addition, a radial diffusor 15 may be arranged at the end of the mixing pipe 13. The purpose of the radial diffusor 15 is to guide the fibre suspension in the desired direction towards the desired location. The radial diffusor 15 is a nozzle which changes the flow direction of a fibre suspension from vertical into horizontal. The flow can also be directed diagonally downwards or upwards or in different directions from various angular positions. The fibre suspension flows out of the radial diffusor 15 at the whole circumference of a circle or at a part thereof. The dimension between the lower and the upper lip of the radial diffusor 15 may be changed to adjust the amount of fibre suspension to be guided at each angle. On the other hand, the distance between the lower and the upper lip is adjusted to generate a desired flow rate for the fibre suspension.

In the flotation cell 1, ink and other impurities stick to the bubbles which are formed of air and flotation agent and rise to the surface of the fibre suspension, from which ink and other impurities may be removed by means of a scraper not shown in FIG. 1 or by means of overflow. The overflow shown in FIG. 1 is generated by a dam plate 19, in which case foam formed on the surface of the fibre suspension and the ink and other impurities included in the foam are moved over the dam plate 19 into a reject space 20, from which they are guided further through a reject discharge channel 21 to further processing. FIG. 1 also schematically illustrates a discharge channel 14 in the flotation cell for feeding purified fibre suspension forward in the pulp manufacturing process. The basic structure and operation of the flotation cell 1 are known per se to a person skilled in the art, for which reason they will not be discussed in greater detail.

Figure 2:
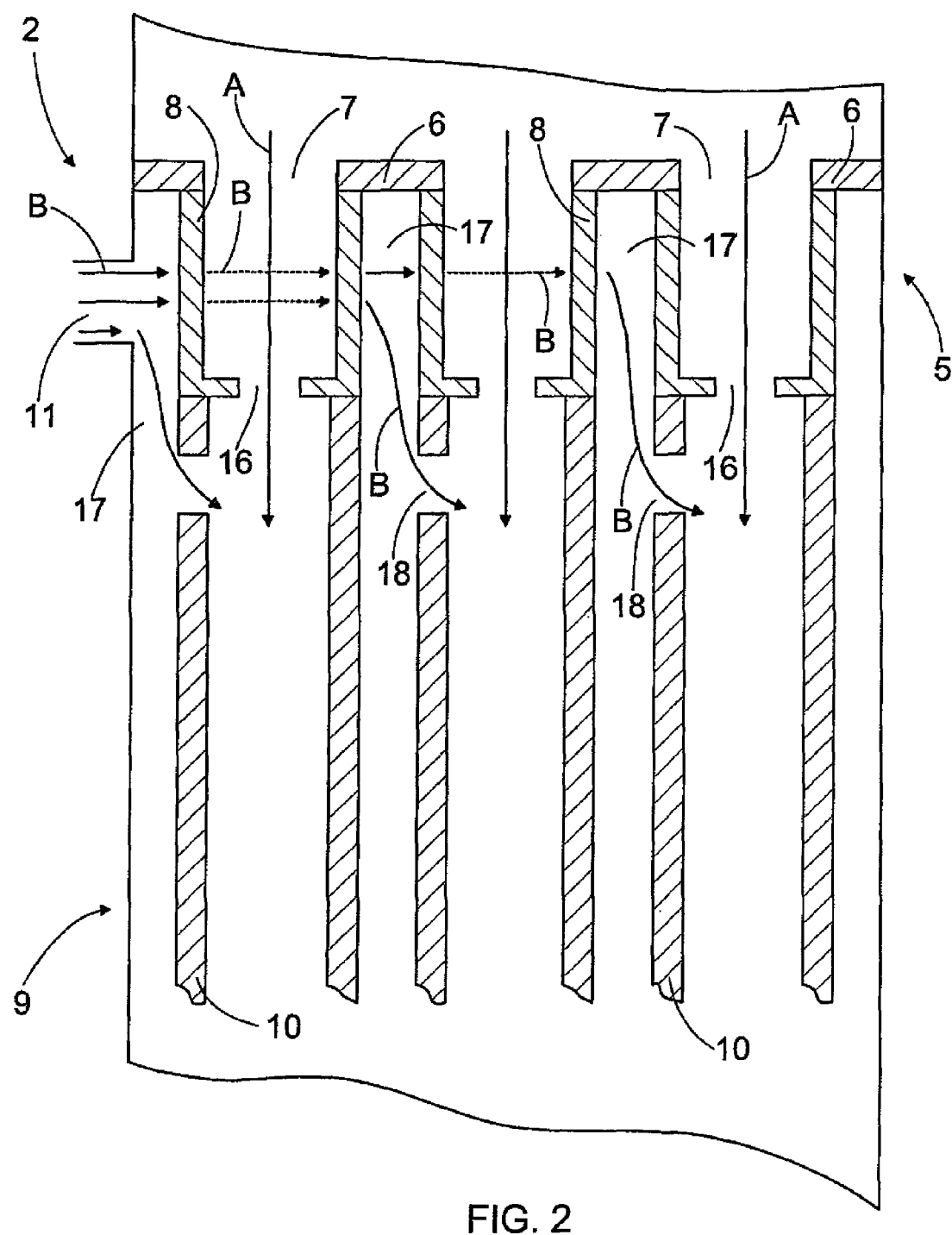

FIG. 2 schematically illustrates a cross section of a feasible nozzle section 5 and mixing apparatus 9 used in the flotation cell 1. The nozzle section 5 according to FIG. 2 comprises an aperture plate 6 provided with apertures 7 and nozzles 8 fixed to the aperture plate 6, substantially at the apertures 7 of the aperture plate 6 below the aperture plate 6. The apertures 7 in the aperture plate 6 divide the fibre suspension flow entering along the feed pipe 3 into partial flows, which are guided forward by the nozzles 8 into the mixing apparatus 9 arranged below the nozzle section 5. The partial flows are illustrated schematically by arrows A. The mixing apparatus 9 is arranged with respect to the nozzles 8 of the nozzle section 5 so that the upper ends of the pipe sections 10 of the mixing apparatus 9 are connected to the lower ends of the nozzles 8. Between the nozzles 8 of the nozzle section 5, there are open spaces 17, and thus the air fed from the air feed connection 11 can flow freely between the nozzles 8. The open spaces 17 also extend between the pipe sections 10 of the mixing apparatus 9 over at least part of the length of the pipe sections 10. The flow of the air between the nozzles 8 is illustrated schematically by arrows B. The side of each pipe section 10 of the mixing apparatus is provided with at least one opening 18, through which air may flow at the pipe sections 10 with the partial flows travelling in the pipe sections 10 of the mixing apparatus 9.

Figure 3:
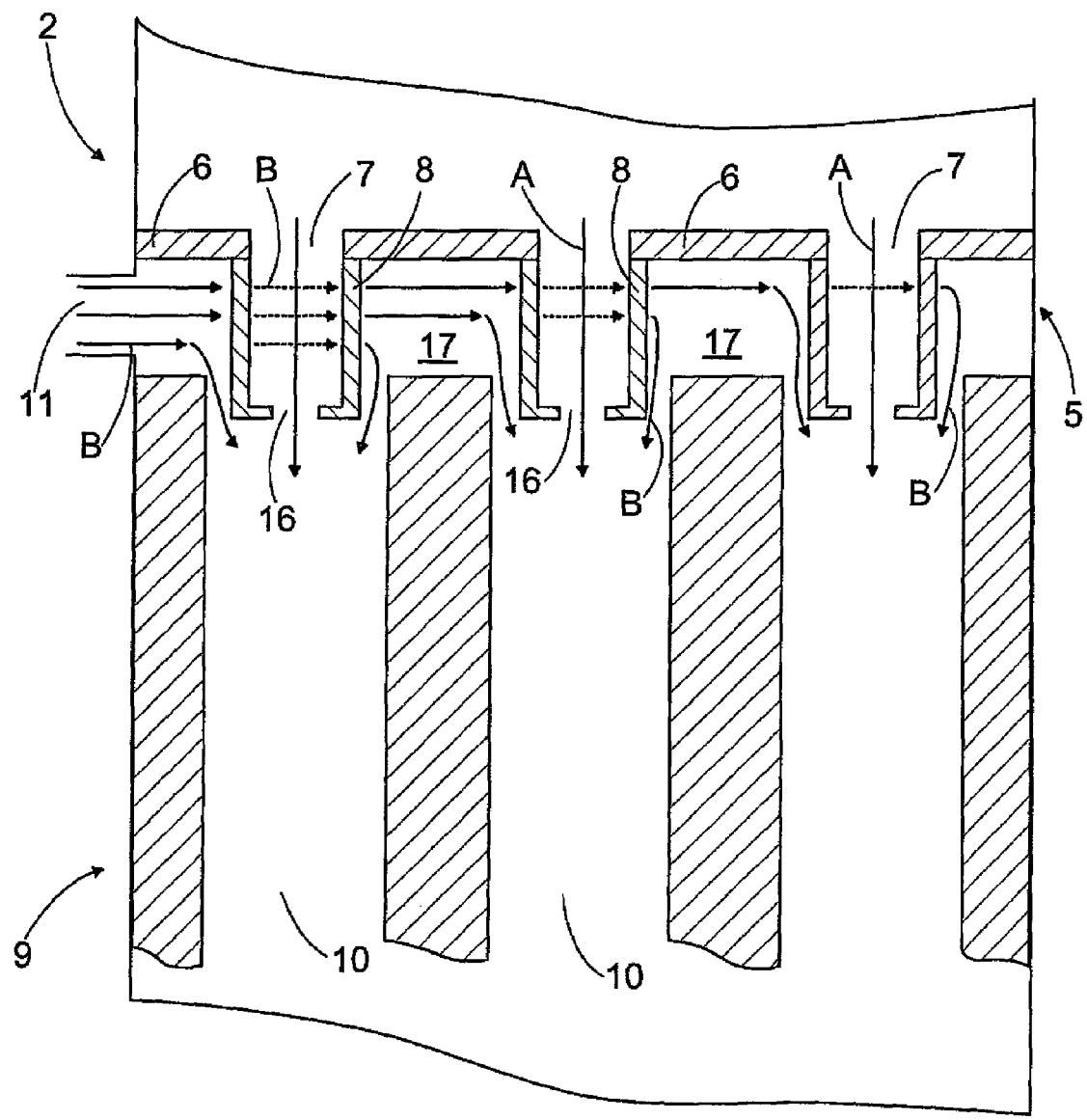

FIG. 3 schematically illustrates a cross section of another feasible nozzle section 5 and mixing apparatus 9 used in the flotation cell 1. The solution according to FIG. 3 differs from the solution of FIG. 2 in that the upper ends of the pipe sections 10 of the mixing apparatus 9 are arranged around the nozzles 8 so that there is a gap between the upper ends of the pipe sections 10 and the nozzles 8 through which the air to be fed from the air feed connection 11 into the open spaces 17 between the nozzles 8 may flow with a partial flow of the fibre suspension flow fed from the nozzle 8 into the pipe section 10 of the mixing apparatus 9. In that case, the openings provided on the side of each pipe section 10 of the mixing apparatus 9 shown in FIG. 2 are not necessarily needed.

The mixing apparatus 9 may also be arranged in such a manner with respect to the nozzle section 5 that there is a space or gap shown in FIG. 1 between the upper ends of the pipe sections 10 of the mixing apparatus 9 and the lower ends of the nozzles 8 of the nozzle section 5, the size of the opening being smaller than 0.1 times the largest diameter of the nozzle's 8 nozzle opening 16, in which case a flow cross-sectional area for guiding air to the mixing apparatus is formed between the nozzles 8 and the pipe sections 10 of the mixing apparatus 9. It is also feasible to provide the nozzle with a head that tapers conically so that a flow cross-sectional area for guiding air to the mixing apparatus is formed between the tapered heads of the nozzles 8 and the pipe sections 10 of the mixing apparatus 9. The end of the pipe section 10 of the mixing apparatus 9 may also be enlarged so that a flow cross-sectional area for guiding air to the mixing apparatus is formed between the head of the nozzle 8 and the enlarged end of the pipe section 10 of the mixing apparatus 9.

The mixing apparatus 9 may also be arranged in such a manner with respect to the nozzle section 5 that a space or a gap shown in FIG. 1 is formed between the upper ends of the pipe sections 10 of the mixing apparatus 9 and the lower ends of the nozzles 8 of the nozzle section 5, the size of the opening being larger than 0.1 times the largest diameter of the nozzle's 8 nozzle opening 16 and smaller than 1.5 times the largest diameter of the nozzle's 8 nozzle opening 16, which leaves an unlimited flow space of a certain size after the nozzles 8 before the mixing apparatus for guiding air to the pipe sections 10 of the mixing apparatus 9.

The nozzles 8 may produce a fibre suspension spray with a wide angle opening, in which case the fibre suspension spreads fast when flowing from the nozzle opening 16. Alternatively, the spray may be provided with a small opening, in which case the spray will remain narrow for a long time. The distance or gap between the nozzle 8 openings 16 and the upper end of the mixing apparatus 9 must be selected so as to ensure that the sprays flowing from the nozzle 8 openings 16 flow completely into the pipe sections 10 of the mixing apparatus 9, in which case the upper end of the mixing apparatus 9 as well as the air channel will be kept free from splashes and air supply will be unrestricted. It is necessary to use a smaller gap in connection with a nozzle 8 producing a spray with a wide angle opening than in connection with a spray with a small opening. A fibre suspension spray with a wide angle opening is generated when, for example, the fibre suspension flows from a polygonal nozzle and a spray with a small opening when, for example, the fibre suspension flows from a circular nozzle.

In each of the alternatives described above, the flow cross-sectional area through which air may flow along with each partial flow is at least 40% of the cross-sectional area of the nozzle 8 openings 16. Preferably, a ratio of 60% or greater is selected as the ratio between the cross-sectional areas. This ensures that the as much air as possible will be introduced into the fibre suspension to obtain efficient flotation. However, this is not always desirable. For example, if a gentle and weak flotation with only a small amount of foaming is to be obtained, air supply can be decreased substantially from the above-mentioned 40%. In primary flotation, as large an amount of foaming as possible is usually desirable, in which case air supply is not limited. The reject of primary flotation may be introduced into secondary flotation where air supply may be restricted.

Thanks to the nozzles 8 and the open spaces 17 between them, the air to be mixed into the fibre suspension flow can be mixed more evenly as the air fed through the open spaces 17 between the nozzles 8 can also flow to the area of or around the nozzles 8 in the middle of the nozzle section 5 and thus to the area of or around the partial flows of the fibre suspension flow to be formed in the middle of the nozzle section 5. The air fed from the air feed connection 11 may thus flow freely from the edges of the aperture plate 6 along the open spaces 17 between the nozzles 8 and spread evenly over the whole area below the aperture plate 6 so that a sufficient amount of air can flow around each nozzle 8. As the partial flows of the fibre suspension flow travel in the nozzles 8 and in the limited spaces which are formed by the pipe sections 10 of the mixing apparatus 9 and between which air may circulate freely, the fibre suspension flow cannot cause splashes or dirty the injector 2 to such an extent that the flow of the air to be mixed into the fibre suspension flow would be hindered in the injector 2 below the aperture plate 6.

In FIGS. 2 and 3, the aperture plate 6 is a flat and straight plate, but the aperture plate 6 may also be a concave or a convex plate when seen from above. In respect of their length, the nozzles 8 may be implemented so that the lower ends of the nozzles 8, where the nozzle openings 16 are located, are in the same plane with respect to each other, in which case the nozzle openings 16 together form a non-uniform planar surface. The nozzles 8 may also be implemented so that in the case of a convex or a concave aperture plate, for example, the shape of the plane formed by the nozzle openings 16 matches the shape of the aperture plate 6, i.e. the nozzle openings 16 together form a non-uniform planar convex or concave surface.

The number of apertures 7 made to the nozzle section 5 may vary. The nozzle sections 5 of FIGS. 2 to 16 show 7 apertures. Depending on the dimensions of the nozzle section 5 and nozzle section 5 openings 16, the nozzle sections 5 may, however, include several dozens of apertures, for instance.

The number of nozzles 8 and pipe sections 10 of the mixing apparatus 9 naturally corresponds to the number of apertures 7 in the nozzle section 5. The apertures 7 in the aperture plate 6 of the nozzle section preferably have a circular cross section, although the cross section of the apertures 7 may vary in several ways.

The nozzles 8 of the nozzle section 5 may be implemented so that the nozzles 8 are parts separate from the aperture plate 6 and, if desirable, detachable from it. The nozzle section 5 may, however, be also implemented so that the aperture plate 6 and the nozzles 8 form a single integrated piece. Such a nozzle section 5 may be produced by casting, for instance.

Figure 4:
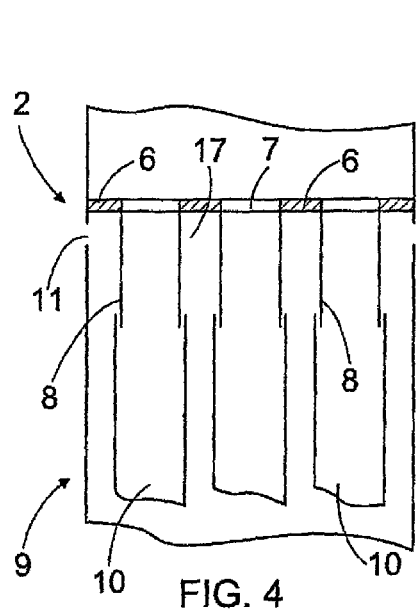
Figure 5:
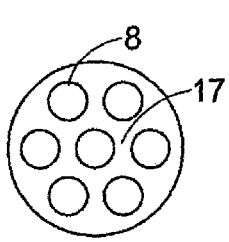
Figure 6:
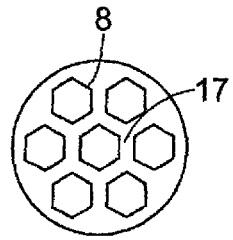
Figure 7:
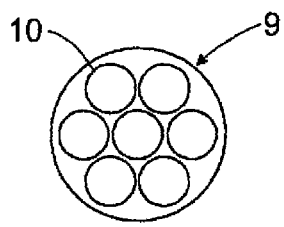
Figure 8:
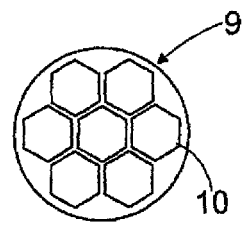

FIG. 4 schematically illustrates an injector where nozzle pipes function as the nozzles of the nozzle section. FIGS. 5 and 6 schematically illustrate feasible cross-sectional shapes and arrangement of the nozzle pipes in the injector according to FIG. 4, and FIGS. 7 and 8 schematically illustrate feasible cross-sectional shapes and arrangement of the pipe sections of the mixing apparatus in the injector according to FIG. 4. The pipe sections illustrated in FIG. 4 include no specific nozzle openings affecting the movement of the partial flows. The cross section of the nozzle pipes may be, for example, circular or polygonal as illustrated in FIGS. 5 and 6. The cross-sectional shape of the pipe sections 10 of the mixing apparatus 9 preferably follows the cross-sectional shape of the nozzle pipes as illustrated in FIGS. 7 and 8.

Figure 9:
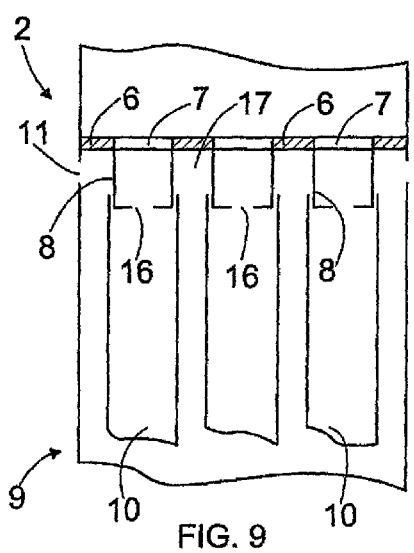
Figure 10:
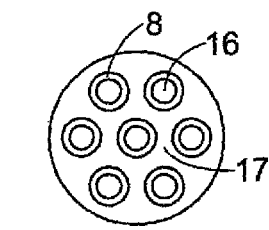
Figure 11:
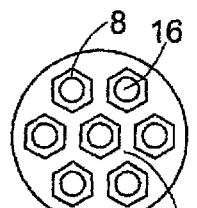
Figure 12:
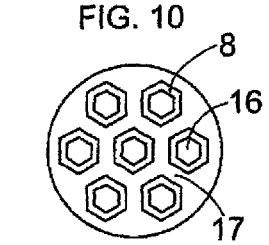
Figure 13:
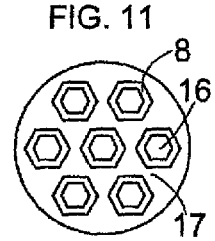
Figure 14:
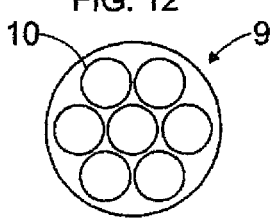
Figure 15:
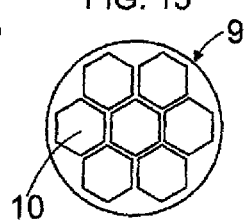

FIG. 9 schematically illustrates an injector where planar nozzle cups, i.e. planar plate nozzles, function as the nozzles 8 of the nozzle section 5. FIGS. 10, 11, 12 and 13 schematically illustrate feasible cross sectional shapes and arrangement of the nozzle pipes in the injector according to FIG. 9, and FIGS. 14 and 15 schematically illustrate feasible cross sectional shapes and arrangement of the pipe sections of the mixing apparatus in the injector according to FIG. 9. The end of the planar nozzle cups illustrated in FIG. 9 from which partial flows are fed into the mixing apparatus is provided with a nozzle opening which restricts the cross-sectional area of the nozzle cup and affects the movement of the partial flows. Various feasible shapes of nozzle openings are illustrated more closely in FIGS. 19 to 26. The cross section of the nozzle cups may be, for example, circular or polygonal, as illustrated in FIGS. 10, 11, 12 and 13. The cross sectional shape of the pipe sections 10 of the mixing apparatus 9 may follow the cross-sectional shape of the nozzle cups as illustrated in FIGS. 14 and 15.

Figure 16:
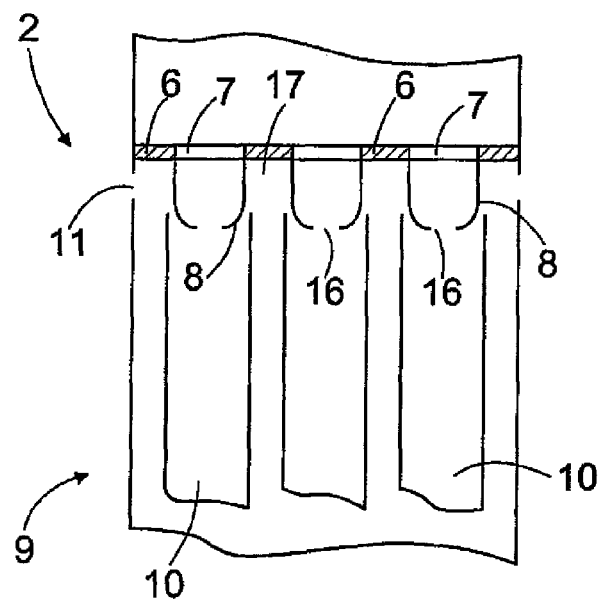

FIG. 16 schematically illustrates an injector where conical nozzle cups function as the nozzles of the nozzle section, the end of the nozzle cups from which partial flows are fed into the mixing apparatus being provided with a nozzle opening which affects the movement of the partial flows and restricts the cross-sectional area of the nozzle cup. Also in this case, the cross section of the nozzle cups may be circular or polygonal as illustrated in FIGS. 10, 11, 12 and 13. The cross-sectional shape of the pipe sections 10 of the mixing apparatus 9 may also follow the cross sectional shape of the nozzle cups as illustrated in FIGS. 14 and 15.

The conical nozzle cup may be implemented in various ways. For example, the cross-sectional area of the nozzle may be arranged to taper in the flow direction of the fibre suspension flow either evenly or suddenly towards the nozzle opening of the nozzle. It may also be implemented by arranging the cross-sectional area of the nozzle to taper conically or curvilinearly in the flow direction towards the nozzle openings of the nozzle. In this context, all these embodiments are interpreted broadly as conical. The embodiments according to FIGS. 2 and 3 employ a nozzle with a planar base, but they may naturally also use conical nozzles.

The mixing apparatus consists of preferably adjacent pipe sections where the partial flows of the fibre suspension flow are fed through the nozzle openings of the nozzles and where the air fed into the open spaces 17 is absorbed by the partial flows. The flow cross-sectional area of the nozzle opening of the nozzle is dimensioned to be 10 to 60%, preferably 20 to 40%, of the flow cross-sectional area of a single pipe section. The length of the pipe section of the mixing apparatus is adjusted to be 4 to 30 times the inner diameter of this pipe section, in which case the fibre suspension and air are mixed efficiently into each other thanks to the strong turbulence maintained by the pipe sections. However, the length ratio may also be greater than 30. Preferably the length ratio is at least 11. When the injector 2 includes nozzles 8 that produce a spray with a wide angle opening, the fibre suspension and air quickly start to mix into each other. In that case, a relatively small value of the length ratio value is sufficient for obtaining perfect mixing of the fibre suspension and air. When nozzles 8 producing sprays with a small opening are used instead, the mixing of the fibre suspension and air starts more slowly, in which case a higher value has to be selected for the length ratio to obtain perfect mixing of the fibre suspension and air.

The pipe sections of the mixing apparatus may have a circular cross section but they may also have the shape of an equilateral polygon, as illustrated in FIGS. 7 and 8, for instance. When the nozzle opening of the nozzle is a polygon, the flow cross section of the respective pipe section of the mixing apparatus may also have a polygonal shape corresponding to the polygon of the nozzle opening or a polygon where the number of angles is smaller or larger than in the polygon of the nozzle opening of the nozzle. It is also feasible to arrange a phase shift having a magnitude of 180 degrees divided by the number of angles between the polygon of the nozzle opening of the nozzle and the respective polygonal pipe section of the mixing apparatus. Such a phase shift can be seen between FIGS. 13 and 15, for instance. The phase shift may also be zero as between FIGS. 12 and 15, for example.

The mixing apparatus is produced of a plastic material by casting, for example. The casting mould of the mixing apparatus consists of an outer casing whose inner space is provided with a desired bank of tubes. After mould casting, the mould casing and bank of tubes are removed, in which case the cast will form an integrated mixing apparatus penetrated by adjacent holes, which form the pipe sections of the mixing apparatus. Naturally, the mixing apparatus may also be formed of separate adjacent pipes.

Figure 17:
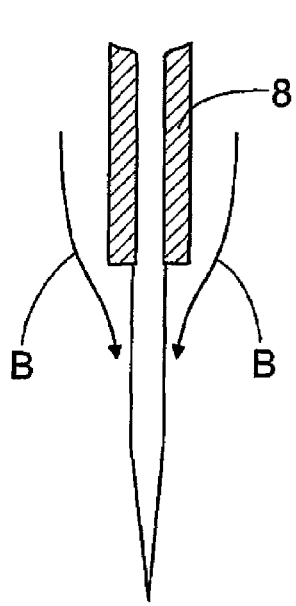
Figure 18:

FIG. 17 schematically illustrates a cross section of a nozzle pipe used as the nozzle 8, and FIG. 18 schematically illustrates the velocity profile of a fibre suspension spray produced by the nozzle 8 according to FIG. 17. The velocity profile of the fibre suspension spray produced by the nozzle pipe illustrated in FIG. 18 is such that the flow rate is at its highest in the middle of the fibre suspension spray and at its lowest at the edges of the fibre suspension spray. The velocity at the edge area of the fibre suspension spray has a considerable influence on the absorption capacity of the injector, i.e. the velocity difference at the interface between the fibre suspension flow and air. For this reason, a slow rate of the fibre suspension spray at the edge area decreases the absorption capacity or ratio of the injector. FIG. 17 schematically illustrates absorption of air into the fibre suspension spray by arrow B.

Figure 19:
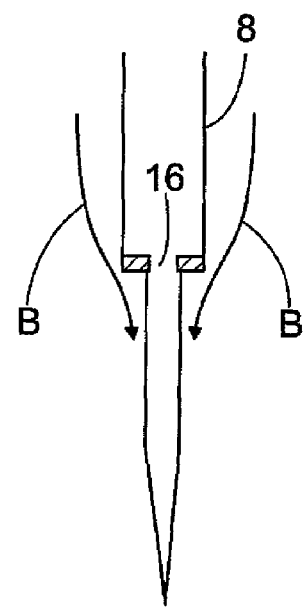
Figure 20:

FIG. 19 schematically illustrates a cross section of another feasible nozzle 8 for use in the nozzle section 5 and FIG. 20 the velocity profile of a fibre suspension spray produced by the nozzle 8 of FIG. 19. FIG. 19 illustrates a plate nozzle, i.e. a nozzle where the area of the nozzle opening 16 has been narrowed by suddenly decreasing the cross section. The fibre suspension spray generated by the plate nozzle illustrated in FIG. 19 produces a velocity profile where the flow rate of the fibre suspension spray is at its lowest in the middle and at its highest at the edges. As a result of this, the velocity difference at the interface between the fibre suspension flow and air is great. Thanks to the high velocity of the fibre suspension spray at the edge, the absorption capacity or rate of the injector provided with the plate nozzles illustrated in FIG. 19 is good. FIG. 19 schematically illustrates absorption of air into the fibre suspension spray by arrow B.

To achieve the flow velocity profile according to FIG. 20, the flow cross-sectional area is suddenly narrowed from the feed pipe 3 towards the nozzle openings 16 of the nozzles 8 so that the area of the nozzle openings 16 of the nozzles 8 is 5 to 50% of the cross-sectional area of the feed pipe 3. In addition, the dimension of the nozzle openings 16 of the nozzles 8 in the flow direction of the fibre suspension is preferably less than 30% of the diameter of a corresponding circular nozzle opening. In the case of a large nozzle opening, the absolute thickness of the plate surrounding the nozzle opening 16 will constitute a determining factor. The thickness may be at most 10 mm; if the plate is thicker, the diameter of the nozzle opening must be arranged to open in the flow direction of the fibre suspension.

In practice, the use of the plate nozzle according to FIG. 19 enables an injector absorption ratio that is 70 to 80% better than that achieved by the long nozzle illustrated in FIG. 17. In practice, this means that a lot larger quantity of air can be mixed into the spray of the fibre suspension flow by using a plate nozzle than by using a long nozzle, and consequently the cleaning efficiency of the flotation cell increases and the cleaning of the fibre suspension becomes faster.

In addition to the selection of the nozzle type shown in FIGS. 17 to 20, the injector absorption ratio can be influenced by the shape of the cross section of the nozzle's 8 nozzle opening 16. The simplest cross-sectional shape of the nozzle opening 16 of the nozzle is circular, but also elliptical and star-shaped cross sections of the nozzle opening 16 may be used. An advantage of the star-shaped cross section of the nozzle over the circular nozzle opening is its better air absorption capacity since the contact surface of the fibre suspension spray discharged from the star-shaped nozzle opening, i.e. the circumferential length of the nozzle's nozzle opening with respect to the surrounding air, is larger compared to the contact surface of the fibre suspension spray discharged from a circular nozzle opening. The larger contact surface produces a larger air coefficient of the nozzle, i.e. a better air absorption capacity of the injector. Furthermore, the nozzle with a star-shaped nozzle opening disperses the fibre suspension spray faster, and thus the fibre suspension and air mix into each other more efficiently.

A disadvantage of the star-shaped nozzle opening is that it easily gets dirty and blocked. Furthermore, the structure of the nozzle opening is complex in the case of a star-shape with several spikes, in particular. The production costs of a star-shaped nozzle opening are also typically higher than those of a circular nozzle opening.

Figure 21:
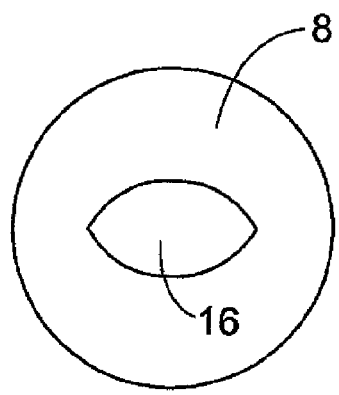
Figure 22:
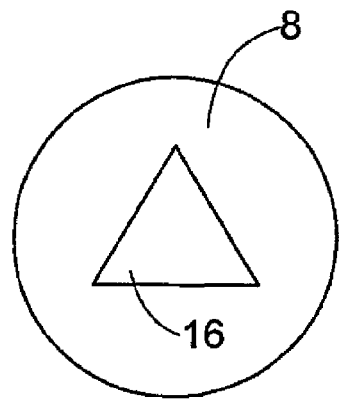
Figure 23:
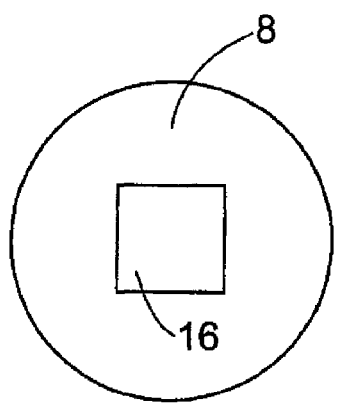
Figure 24:
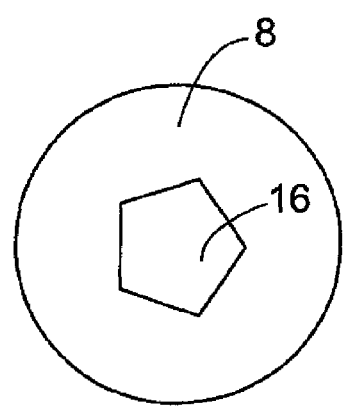
Figure 25:
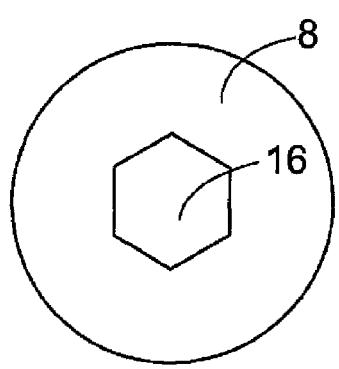
Figure 26:
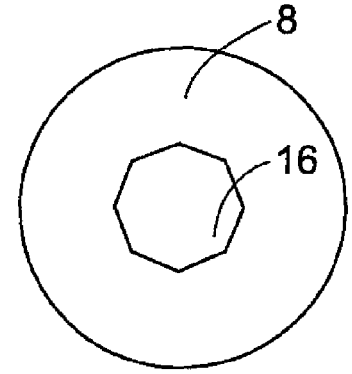

FIGS. 21 to 26 schematically illustrate cross sections of polygonal structures of the nozzle's 8 nozzle opening 16. FIG. 21 illustrates a digonal nozzle opening, FIG. 22 a trigonal nozzle opening, FIG. 23 a quadrangular nozzle opening, FIG. 24 a pentagonal nozzle opening, FIG. 25 a hexagonal nozzle opening and FIG. 26 an octagonal nozzle opening. All the polygonal nozzle openings illustrated in FIGS. 21 to 26 are characterized in that the sides and angles of the polygons allow the production of a star-shaped spray of the fibre suspension flow. Their operation is based on the basic principle that, from the middle of the sides of the polygon, the spray turns outwards from the middle line of the spray and towards the middle line of the spray from the edges. The opening angle of the spray is a characteristic parameter of each polygon and varies according to the number of angles in the polygon.

The nozzle opening 16 of the nozzle 8 shaped into a polygon can produce an efficient star-shaped spray. Compared to a star-shaped nozzle opening, the nozzle provided with a polygonal nozzle opening has a simple structure and the more open structure of the nozzle opening reduces the risk of the opening getting blocked or dirty. Furthermore, the opening angle of the spray from a nozzle provided with a polygonal nozzle opening is wider than that of a nozzle provided with a star-shaped nozzle opening, and thus the spray is dispersed and the fibre suspension flow and air mixed into each other more perfectly.

In some cases, the features described in this application may be used as such regardless of the other features. On the other hand, if necessary, the features described in this application may be combined to obtain various combinations.

The drawings and the related description are only intended to illustrate the inventive concept. The details of the invention may vary within the scope of the claims. Each FIG. 1 to 20 illustrates either the whole injector or part of it arranged in a vertical direction but it is clear that the flotation cell may also be implemented by arranging the injector and its parts in a horizontal direction with respect to the flotation cell or at another angle. The nozzle section 5 of the injector 2 of the flotation cell 1 is usually completely above the surface of the fibre suspension in the flotation cell 1. Thus the air feed connection may be implemented without the casing around the nozzles 8 of the nozzle section 5, i.e. the air feed connection consists of an open connection between the air space of the flotation cell 1 and the nozzles 8. In that case, the feed pipe 3 may support the mixing apparatus 9 by means of narrow plate battens arranged between the parts in question, for example.

That which is claimed:

1. An injector of a flotation cell, the injector comprising a feed pipe for feeding a fiber suspension flow into the flotation cell, a mixing apparatus for mixing air into the fiber suspension flow and at least one air feed connection arranged before the mixing apparatus for feeding air into the injector, wherein:

the injector further comprises a nozzle section which is arranged before the mixing apparatus and comprises an aperture plate provided with apertures and nozzles fixed to the aperture plate substantially at the apertures after the aperture plate, there being open spaces between the nozzles and the apertures in the aperture plate of the nozzle section being arranged to divide the fiber suspension flow to be fed into the feed pipe into partial flows, and the nozzles of the nozzle section being arranged to guide the partial flows into the mixing apparatus, and the aperture plate of the nozzle section being arranged before the air feed connection so that the air feed connection is arranged in the injector in the area surrounding the nozzles of the nozzle section so that the air to be fed from the air feed connection is arranged to flow into the spaces between the nozzles and further into the mixing apparatus with the partial flows of the fiber suspension flow entering from the nozzles;

the mixing apparatus comprises pipe sections where the partial flows of the fiber suspension flow are guided from the nozzles and where the partial flows and the air carried by them are arranged to be mixed into each other;

ends of the pipe sections of the mixing apparatus that are to be directed at the nozzles of the nozzle section are fixed to the nozzles of the nozzle section; and there is at least one opening on the side of the pipe sections of the mixing apparatus to enable air flow into the mixing apparatus.

2. An injector according to claim 1, wherein there is an injector casing and the air feed connection is arranged in the casing in the nozzle section.

3. An injector according to claim 1, wherein the nozzle is a pipe nozzle.

4. An injector according to claim 1, wherein the nozzle is a planar plate nozzle where the cross-sectional area of the nozzle opening has been tapered by suddenly reducing the cross section.

5. An injector according to claim 1, wherein the nozzle is a conical nozzle where the cross-sectional area of the nozzle tapers in the flow direction of the fiber suspension.

6. An injector according to claim 1, wherein the nozzle opening of the nozzle is circular, elliptical, star-shaped or polygonal.

7. An injector according to claim 6, wherein the polygonal nozzle opening has a digonal, trigonal, quadrangular, pentagonal, hexagonal or octagonal shape.

8. An injector according to claim 1, wherein the aperture plate of the nozzle section is straight, concave or convex.

9. An injector according to claim 1, wherein the nozzles are detachably attached to the aperture plate.

10. An injector according to claim 1, wherein the nozzles and the aperture plate form a single integrated piece.

11. An injector according to claim 1, wherein the nozzle is a tubular nozzle.

12. A flotation cell for removing ink or impurities from a fiber suspension, wherein the flotation cell comprises at least one injector comprising a feed pipe for feeding a fiber suspension flow into the flotation cell, a mixing apparatus for mixing air into the fiber suspension flow, at least one air feed connection arranged before the mixing apparatus for feeding air into the injector, and a nozzle section which is arranged before the mixing apparatus and comprises an aperture plate provided with apertures and nozzles fixed to the aperture plate substantially at the apertures after the aperture plate, there being open spaces between the nozzles and the apertures in the aperture plate of the nozzle section being arranged to divide the fiber suspension flow to be fed into the feed pipe into partial flows, and the nozzles of the nozzle section being arranged to guide the partial flows into the mixing apparatus, and the aperture plate of the nozzle section being arranged before the air feed connection so that the air feed connection is arranged in the injector in the area surrounding the nozzles of the nozzle section so that the air to be fed from the air feed connection is arranged to flow into the spaces between the nozzles and further into the mixing apparatus with the partial flows of the fiber suspension flow entering from the nozzles, and wherein:

the mixing apparatus comprises pipe sections where the partial flows of the fiber suspension flow are guided from the nozzles and where the partial flows and the air carried by them are arranged to be mixed into each other;

ends of the pipe sections of the mixing apparatus that are to be directed at the nozzles of the nozzle section are fixed to the nozzles of the nozzle section; and there is at least one opening on the side of the pipe sections of the mixing apparatus to enable air flow into the mixing apparatus.

13. A method of mixing a fiber suspension flow and air into each other in a flotation cell injector, the injector comprising a feed pipe for feeding a fiber suspension flow into the flotation cell, a mixing apparatus for mixing air into the fiber suspension flow and at least one air feed connection arranged before the mixing apparatus for feeding air into the injector, the method comprising:

feeding the fiber suspension flow into the injector, dividing the fed fiber suspension flow into partial flows, feeding air to be mixed into the fiber suspension flow into the injector, feeding the partial flows of the fiber suspension flow into the mixing apparatus forming a pre-mixing phase of the injector, whereby air fed into the injector is carried into the pre-mixing phase by the partial flows, and mixing air carried into the pre-mixing phase by the partial flows into these partial flows, wherein:

the injector further comprises a nozzle section which is arranged before the mixing apparatus and comprises an aperture plate provided with apertures for dividing the fiber pulp flow to be fed into the feed pipe into partial flows and nozzles fixed to the aperture plate substantially at the apertures after the aperture plate to guide the partial flows to the mixing apparatus, there being open spaces between the nozzles, whereby the air is fed into open spaces between the nozzles of the nozzle section and the air flows from the spaces with the partial flows of the fiber pulp flow into a pre-mixing phase the mixing apparatus comprises pipe sections where the partial flows of the fiber suspension flow are guided from the nozzles and where the partial flows and the air carried by them are arranged to be mixed into each other;

ends of the pipe sections of the mixing apparatus that are to be directed at the nozzles of the nozzle section are fixed to the nozzles of the nozzle section; and there is at least one opening on the side of the pipe sections of the mixing apparatus to enable air flow into the mixing apparatus.

* * * * *